(12) United States Patent
Wu et al.

(10) Patent No.: US 7,875,672 B2
(45) Date of Patent: Jan. 25, 2011

(54) TWO COMPONENT WATERBORNE POLYURETHANE COATINGS FOR ANTI-GRAFFITI APPLICATION

(75) Inventors: Xiaodong Wu, Shanghai (CN); Richard P. Rosen, Princeton, NJ (US)

(73) Assignee: Perstorp France, Saint Priest (FR)

( * ) Notice: Subject to any disclaimer, the term of this patent is extended or adjusted under 35 U.S.C. 154(b) by 183 days.

(21) Appl. No.: 12/196,620

(22) Filed: Aug. 22, 2008

(65) Prior Publication Data

US 2009/0054570 A1    Feb. 26, 2009

Related U.S. Application Data

(60) Provisional application No. 60/957,770, filed on Aug. 24, 2007.

(51) Int. Cl.
| | |
|---|---|
| C08F 8/00 | (2006.01) |
| C08F 8/30 | (2006.01) |
| C08F 283/04 | (2006.01) |
| C08G 18/08 | (2006.01) |
| C08G 18/28 | (2006.01) |
| C08J 3/00 | (2006.01) |
| C08K 3/20 | (2006.01) |
| C08L 27/00 | (2006.01) |
| C08L 75/00 | (2006.01) |

(52) U.S. Cl. .................. 524/507; 524/589; 524/590; 524/591; 524/839; 524/840; 525/123; 525/125; 525/127; 525/129; 525/455

(58) Field of Classification Search ............... 524/507, 524/589, 590, 591, 839, 840; 525/123, 455, 525/125, 127, 129
See application file for complete search history.

(56) References Cited

U.S. PATENT DOCUMENTS

| | | | | |
|---|---|---|---|---|
| 4,716,056 | A | 12/1987 | Fox | |
| 5,508,340 | A | 4/1996 | Hart | |
| 5,852,111 | A * | 12/1998 | Watanabe et al. | 524/839 |
| 6,103,327 | A | 8/2000 | Bragole | |
| 6,383,651 | B1 | 5/2002 | Weinert et al. | |
| 6,423,381 | B1 | 7/2002 | Colton et al. | |
| 2003/0158328 | A1 * | 8/2003 | Nabavi et al. | 524/589 |
| 2004/0192835 | A1 * | 9/2004 | Steidl et al. | 524/591 |
| 2005/0245675 | A1 * | 11/2005 | Haberle et al. | 524/589 |
| 2006/0167206 | A1 | 7/2006 | Ingrisch et al. | |

| | | |
|---|---|---|
| 2008/0213599 | A1 | 9/2008 Webster |

FOREIGN PATENT DOCUMENTS

| | | |
|---|---|---|
| CA | 2189898 | 6/2007 |
| EP | 808881 | 11/1997 |
| EP | 1027382 | 5/1999 |
| EP | 1116759 | 7/2001 |
| EP | 1410888 | 4/2004 |
| EP | 1801133 | 6/2007 |
| EP | 1559733 | 8/2007 |
| EP | 1820809 | 8/2007 |
| EP | 08798466.2 | 9/2010 |
| WO | WO 9006958 | 6/1990 |
| WO | WO 9306166 | 4/1993 |
| WO | WO 9420559 | 9/1994 |
| WO | WO 9717411 | 5/1997 |
| WO | WO 9811854 | 3/1998 |
| WO | 01/38415 | 5/2001 |
| WO | WO 2004112482 | 12/2004 |
| WO | WO 2005007722 | 1/2005 |
| WO | WO 2007008959 | 1/2007 |
| WO | WO 2007026117 | 3/2007 |
| WO | WO 2007071323 | 6/2007 |

OTHER PUBLICATIONS

Wu, et al., "New Low Voc 2k Waterborne Polyurethane Coatings Using Rhodocoat® Hydrophillic Polyisocyanates", Presented at the Waterborne Symposium, Advances in Intelligent Coatings Design, Feb. 14-16, 2007.
Scheerder, et al., "Novel, Water Based Fluorinated Polymers With Excellent Anti-Graffiti Properties", CT Research, vol. 2, No. 8, p. 617, Oct. 2005.
Wu, et al., "Development of Low-VOC 2K Waterborne Polyurethane Anti-Graffiti Coatings", Presented at The Waterborne, High-Solids, and Powder Coating Symposium, pp. 66-72, Jan. 30-Feb. 1, 2008.

* cited by examiner

*Primary Examiner*—Patrick D Niland
(74) *Attorney, Agent, or Firm*—Michael B. Fein; Cozen O'Connor

(57) ABSTRACT

Two component (2K) waterborne polyurethane coating compositions which when cured achieve excellent anti-graffiti properties at low VOC level (below 100 g/L) are disclosed. The composition comprises (A) a fluorinated polyol and optionally a non-fluorinated polyol; and (B), a blend of polyisocyanates comprising a hydrophilically modified trimer of hexamethylene diisocyanate (HDT) and a hydrophilic ally modified trimer of isophorone diisocyanate (IPDT). The glass transition temperature of the ambient cured coatings, crosslinked network structure, and fluorine content at the surface enable excellent anti-graffiti properties. The waterborn coatings of the invention have excellent recoatability and exceptional chemical resistance.

7 Claims, 1 Drawing Sheet

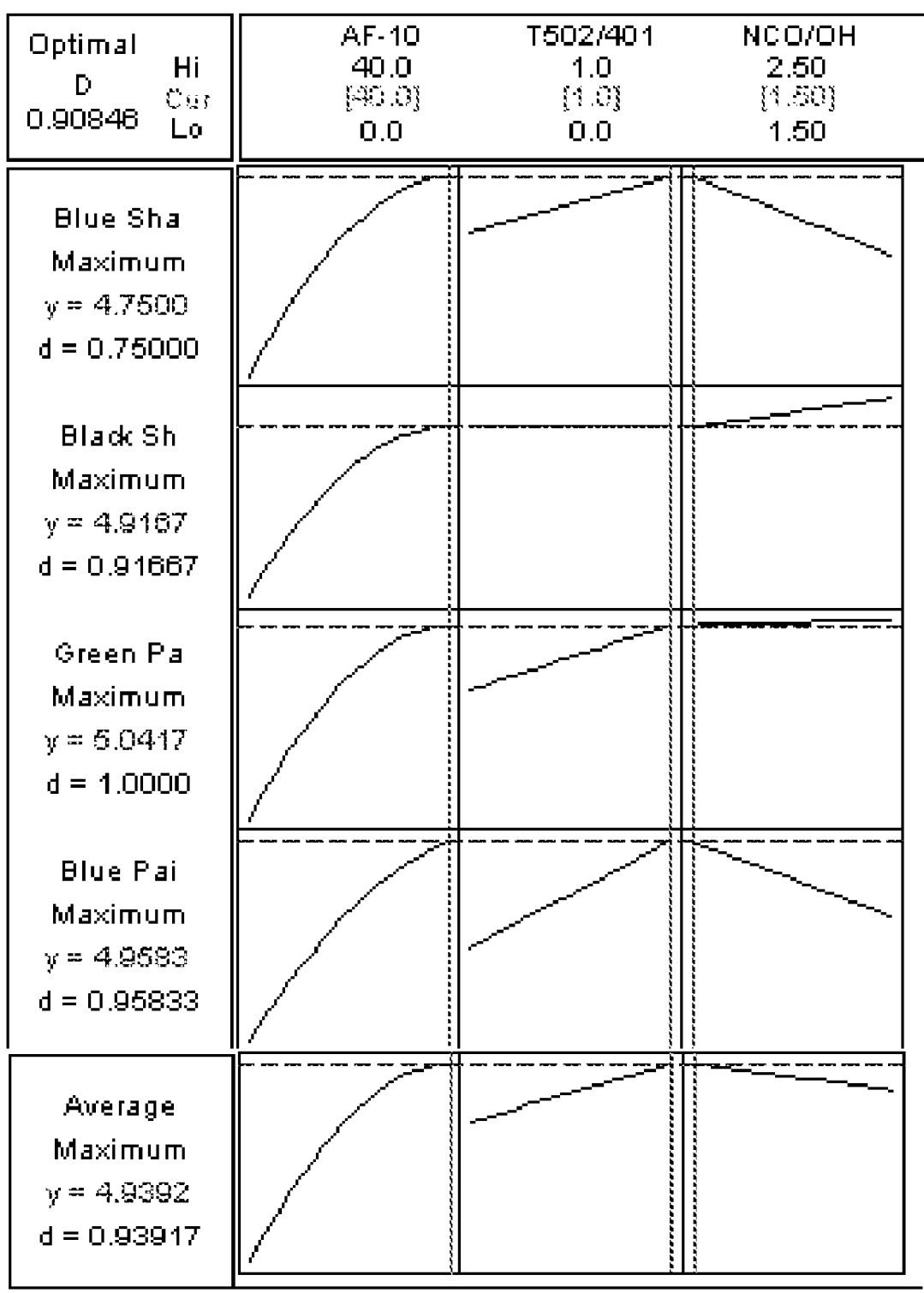
Figure 1 - DOE studies on anti-graffiti properties

TWO COMPONENT WATERBORNE POLYURETHANE COATINGS FOR ANTI-GRAFFITI APPLICATION

CROSS-REFERENCE TO RELATED APPLICATIONS

Benefit of U.S. Provisional Application Ser. No. 60/957,770, filed Aug. 24, 2007, is claimed and said application is hereby incorporated by reference in its entirety.

BACKGROUND OF THE INVENTION

This invention relates to the field of anti-graffiti paints, more particularly to polyurethane coatings with resistance to graffiti paint and to methods of imparting graffiti resistance to polyurethane coatings.

Graffiti paint contains dye and solvents, the dye molecules tending to diffuse or penetrate into the coating after the graffiti paint is applied onto a coating surface. The deeper the penetration, the more difficult is the removal process. One approach in the current art is to use perfluoro-, fluorine-, or silicone-modified materials, including polyols, to reduce the surface energy of the coating and thereby dewet any graffiti paint and reduce contact. The less the contact of graffiti paint on the surface, the less amount of undesired graffiti paint will stay on the coating. Also most of the modifications are focused on the polyol side in prior two component waterborne polyurethane systems.

SUMMARY OF THE INVENTION

It is an object of the present invention to provide a waterborne polyurethane coating having good barrier properties which can limit diffusion or penetration of graffiti paint.

Another object is to provide a method of improving anti-graffiti properties of waterborne polyurethane coatings.

These objects, and others which will become apparent from the following disclosure, are achieved by the present invention which comprises in one aspect an anti-graffiti coating composition comprising (A) at least one polyol comprising a fluorinated polyol; and (B) a blend of polyisocyanates comprising (i) a hydrophilically modified trimer of hexamethylene diisocyanate (HDT) and (ii) a hydrophilic ally modified trimer of isophorone diisocyanate (IPDT).

The waterborne coating compositions have low VOC, preferably below 100 g/L.

The fluorinated polyol preferably comprises 1 to 40% by weight of the mixture of polyols. Preferably the molar ratio of isocyanate units to hydroxyl units is about 1.2 to 3.0, more preferably is about 1.5 to 2.5.

The substrates to be coated can be any surfaces that needs protection, including concrete, wood, metal. Coating films on such substrates impart anti-graffiti properties.

The coatings of the invention in many embodiments have gloss greater than 85 at 60° and also have excellent recoatability and chemical resistance properties.

BRIEF DESCRIPTION OF DRAWINGS

FIG. 1 is a graphical representation of the results of an experiment designed to show the effects of a fluorinated polyol on anti-graffiti properties of a coating formulation.

DETAILED DESCRIPTION OF THE INVENTION

Generally a formulation for a two-component water-based polyurethane coating will comprise a hydrophilically modified polyisocyanate part and an aqueous polymer dispersion which may be a polyol or a blend of polyols.

We have discovered that a two-component water-based polyurethane coating which is the reaction product of a composition comprising (A) at least one polyol comprising a fluorinated polyol; and (B) a blend of polyisocyanates comprising at least (i) a hydrophilic ally modified trimer of hexamethylene diisocyanate (HDT) and (ii) a hydrophilically modified trimer of isophorone diisocyanate (IPDT), has excellent coating characteristics, such as gloss, hardness, pot-life, dry time, chemical resistance, durability, recoatability, and anti-graffiti properties.

It may be useful to bring the mixture down to appropriate application viscosity values by the addition of appropriate solvent(s) and/or water.

The preparation of hydrophilically modified HDT and IPDT used in the compositions of the invention is described in U.S. Pat. Pub. 2005/0154175 by Nabavi, et al., which is hereby incorporated by reference.

Alternatively a surfactant may be grafted onto an isocyanate to prepare the HDT or IPDT as disclosed in DE-A-35 21 618, DE-A-40 01 783 and DE-A-42 03 510.

The content of hydrophilic nonionic groups, in particular of polyalkylene ether groups, is preferably from 0.5% to 20%, particularly preferably from 1 to 15% by weight, based on the hydrophilic polyisocyanates.

Preferred hydrophilic polyisocyanates are those containing hydrophilic, nonionic groups, in particular polyalkylene ether groups. The water emulsifiability is preferably achieved exclusively by the hydrophilic nonionic groups.

In a two-component polyurethane coating composition, the hydrophilic polyisocyanate composition is used as an additive, for example, a crosslinking agent or hardener, for aqueous polymer dispersions or emulsions. To produce films, two-components are mixed, I) the hydrophilic polyisocyanate, which may or may not be blocked, and II) a dispersion of aqueous polymers. In accordance with the invention, the aqueous polymer dispersion is a blend of acrylic polyol and fluorinated acrylic polyol. The polyol blend may be obtained by radical polymerization.

Simple mixing by using mechanical devices or simple hand mixing of the hydrophilic polyisocyanate compositions of the invention allows them to be finely dispersed into aqueous emulsions or dispersions. The emulsions obtained in accordance with the invention exhibit improved pot-life.

The mixture of the dispersions, which may also contain pigments and fillers, is then deposited on a substrate in the form of a film with the aid of conventional techniques for applying industrial coatings. When the preparation contains blocked isocyanates the combination of film plus substrate is cured at a sufficient temperature to ensure the de-blocking of the isocyanate functional groups and the condensation of the latter with the hydroxyl groups of the aqueous polymer dispersion particles.

In the present description the particle size characteristics frequently refer to notations of the $d_n$ type, where n is a number from 1 to 99; this notation is well known in many technical fields but is a little rarer in chemistry, and therefore it may be useful to give a reminder of its meaning. This notation represents the particle size such that n % (by weight, or more precisely on a mass basis, since weight is not a quantity of matter but a force) of the particles are smaller than or equal to the said size.

In accordance with the invention the mean sizes ($d_{50}$) of the hydrophilic polyisocyanate emulsion and the aqueous polymer dispersion is less than 1000 nm, preferably less than 500 nm and is most preferably between about 50 nm and 200 nm. Preferred aqueous polymer dispersions employed in combination with these emulsions have mean sizes measured by quasi-elastic scattering of light which are between 20 nm and 200 nm and more generally between 50 nm and 150 nm.

An objective of the present invention is to provide compositions comprising a hydrophilic isocyanate emulsion and an aqueous acrylic polyol/fluorinated acrylic polyol blend which are physically stable for at least 2 hrs, preferably 4, most preferably 6 to 24 hrs. The other objective of the invention is to obtain, from these stable and fluid mixtures, films exhibiting good gloss, transparency and solvent (or chemical) resistance properties.

The ratio of the number of hydroxyl functional groups to the number of isocyanate functional groups, masked or otherwise, can vary very widely, as shown above. Ratios that are lower than the stoichiometry promote plasticity, while ratios that are higher than the stoichiometry produce coatings of great hardness. These ratios are typically in a range extending between about 1.0 and 3.0.

The aqueous polymer blend of the invention comprises an acrylic polyol and a fluorinated acrylic polyol. Any suitable water dispersible or water reducible acrylic polyol and fluorinated acrylic polyol may be used.

The polyol can already be in an aqueous or water-soluble or water-dispersible medium.

It may be an aqueous solution (which may in particular be obtained after neutralization of the ionic groups) or an emulsion of the polymer in water or a dispersion of latex type.

In particular it is preferably possible to employ lattices, especially nano-lattices (that is to say lattices in which the particle size is nanometric [more precisely, in which the $d_{50}$ is at most equal to approximately 100 nm])

Thus, according to one of the particularly preferable applications of the present invention, the polyol is preferably a latex of nanometric size exhibiting the following characteristics:

d50 of between 15 nm and 60 nm, preferably between 20 nm and 40 nm carboxylate functional group from 0.5 to 5% by mass solid content: between 25 and 40% a $d_{80}$ smaller than 1 micrometer

In accordance with the invention, a preferred acrylic polyol, has a glass transition temperature of from 10 to 100° C., preferably from 20° C. to 80° C. A preferred fluorinated acrylic polyol, has a glass transition temperature of from −0° C. to 100° C., preferably from 10° C. to 80° C.

The lattices (which are not functionalized in respect of isocyanate which are optionally masked) that are described in the French Patent Application filed on 28 Apr. 1995 No. 95/05123 and in the European Patent Reflex Application No. EP 0,739,961 give very good results.

Thus the latex particles preferably exhibit an acidic (preferably carboxylic) functional group content that is accessible of between 0.2 and 1.2 milliequivalents/gram of solid content and they exhibit an accessible alcoholic functional group content of between 0.3 and 1.5 milliequivalents/gram.

Thus, as indicated in this document the lattices consisting of particles carrying functional group(s) according to the invention are preferred, are hydrophobic and preferably have a size ($d_{50}$) that is generally between 50 nm and 150 nm. They are calibrated, mono-disperse, and present in the latex in a proportion of a quantity varying between 0.2 to 65% by weight of the total weight of the latex composition.

More preferred aqueous polymer dispersions containing reactive hydrogen groups are the known polyols and polyacrylates. In a preferred embodiment of the invention, the acrylic polyol component of the film forming aqueous acrylic polyol/fluorinated acrylic polyol blend reactable with the hydrophilic isocyanate is an acrylic resin, which may be a polymer or oligomer. The fluorinated acrylic polyol is also an acrylic resin, which is polymerized using at least one fluorinated acrylic-type monomer. The acrylic polymer or oligomer preferably has a number average molecular weight of 500 to 1,000,000, and more preferably of 1000 to 30,000. Acrylic polymers and oligomers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such resins include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylaminoethylacrylate. Other acrylic monomers having active hydrogen functional groups in the ester portion of the monomer, such as vinyl esters or vinyl acetate, are also within the skill of the art. Other monomer units may be substituted styrene derivatives, such as, for example, vinyltoluenes, α-methylstyrene, propenylbenzene, isobornyl acrylate.

Other modified acrylics can also be used. Such acrylics may be polyester-modified acrylics or polyurethane-modified acrylics, as is well-known in the art. Polyester-modified acrylics modified with e-caprolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is also incorporated herein by reference.

The preparation of the polyol components preferably takes place directly in aqueous phase by emulsion polymerization. In accordance with the invention, an acrylic polyol and fluorinated acrylic polyol may be synthesized with the phosphated monomers of the invention, to form the aqueous polymer blend component of a two-component system. Preferably, the acrylic polyol is synthesized with from about 0.5% to about 10% by weight ("% by wt.") phosphated monomers. Most preferably the acrylic polyol is synthesized with about 4% by wt. phosphated monomers. However any suitable synthesis process may be employed.

The acrylic polyol Neocryl® XK-110 is supplied by DSM Neoresins, Inc. and is a hydroxyl functional styrene acrylic copolymer emulsion. The hydrophilic aliphatic polyisocyanates that include Rhodocoat™ X EZ-M 501, X EZ-M 502 and X EZ-D 401 are produced by Rhodia Inc.

Both Rhodocoat™ X EZ-M 501 and X EZ-M 502 are hydrophilically modified polyisocyanates based on hexamethylene diisocyanate (HDI) technology and X EZ-D 401 is a hydrophilically modified polyisocyanate based on both HDI and isophorone diisocyanate (IPDI) technology as described in U.S. Pat. Pub. 2005/0154175 by Nabavi, et al.

Scheme 1 Chemical structures of HDI and IPDI are as follows:

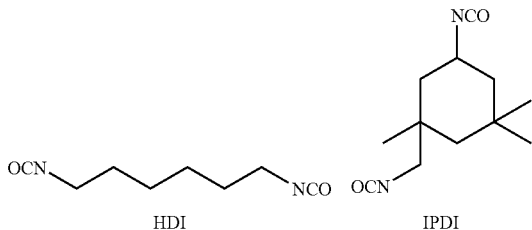

HDI has a linear structure, which gives a soft and flexible nature to the molecules, thus the Tg of its homopolymer is around −56° C. The introduction of the cyclohexyl group into the structure of IPDI significantly increases the chain rigidity. The Tg of its homopolymer of IPDI is about 73° C. It is obvious that the difference in the structure, reactivity and mobility of the building blocks in the Rhodocoat™ polyisocyanates will affect the crosslinking chemistry, especially the initial network morphology during film formation.

Using a blend of Neocryl XK-110, an acrylic polyol, and Neocryl AF-10, a fluorinated acrylic polyol, and some additives in Part A, using Rhodocoat™ X EZ-M 502 alone or using Rhodocoat™ X EZ-M 502 and X EZ-D 401 blend at 1:1 weight ratio for Part B, the formulation platform methodology has been used to optimize the anti-graffiti property of the coatings. The formulation range studied is listed as follows:

| (1) blend ratio of AF-10 in XK-110 | 0-40% |
| (2) Isocyanate composition | X EZ-M 502 |
| | X EZ-M 502/X EZ-D 401 |
| | (1:1 wt ratio) |
| (3) NCO/OH ratio | 1.5-2.5 |

| Sample | AF-10 | Iso Type | NCO/OH |
|---|---|---|---|
| #161 | 40 | 502 | 1.50 |
| #162 | 20 | 502 | 1.50 |
| #163 | 0 | 502 | 1.50 |
| #164 | 40 | 502 | 2.50 |
| #165 | 20 | 502 | 2.50 |
| #166 | 0 | 502 | 2.50 |
| #170 | 40 | 502/401(50/50) | 1.50 |
| #171 | 20 | 502/401(50/50) | 1.50 |
| #172 | 0 | 502/401(50/50) | 1.50 |
| #173 | 40 | 502/401(50/50) | 2.50 |
| #174 | 20 | 502/401(50/50) | 2.50 |
| #175 | 0 | 502/401(50/50) | 2.50 |

Results

The 2K waterborne polyurethane coatings studied in this formulation range result in films having:

| (1) high gloss | >85 @ 60° |
| (2) excellent MEK double rub test | 300⁺ after incorporating fluorinated polyol |
| (3) good crosslinking and film hardness | >250 sec (Persoz) |
| (4) Dry time - Tack-Free time ~3 hours; Dry-Through time 8~14 hours | |
| (5) Exceptional chemical resistance | |
| (6) Excellent recoatability after 24 hours | |

Methyl ethyl ketone (MEK) double rub test is used to assess the development of cure. The test was done one day and seven days after the films cured. A 26 oz hammer with five layers of cheesecloth wrapped around the hammerhead was soaked in MEK. After 50 double rubs the hammer was rewet with MEK. Once mar was achieved the number of double rubs was noted. A fully cured coating was based on 300 double rubs without mar.

Anti-graffiti performance is more complicated as there is variability in the choice of the paints and permanent markers. In addition, the choice of graffiti removal agent is also crucial to reach a good result. The representative testing paints and chemicals are listed as follows:

(1) Permanent markers—blue sharpie, red sharpie, black sharpie, silver metallic sharpie (2) Dry erase marker—green, blue (3) Blue spray paint (4) Green enamel paint The graffiti removal agents are as follows:

(1) Motsenbocker's liftoff #3

(2) Motsenbocker's liftoff #3

(3) Motsenbocker's liftoff #3

(4) KleanStrip of Graffiti Removal by W M Barr

The formulation platform methodology using design of experiment (DOE) has been used to analyze and optimize the coating formulation. The surface response optimization result is shown in FIG. 1.

The DOE model indicates that fluorine content in the coating formulation has an impact on the anti-graffiti property with increasing fluorine content resulting in improved anti-graffiti performance. We have discovered that combining IPDT and HDT in the polyisocyanate part improves the anti-graffiti property according to the following table:

| Comparison of Anti-Graffiti Removal Using Rhodocoat XEZM-502 vs XEZD-401/XEZM-502 at NCO/OH = 1.5 and 40% AF-10 | | | | | | | | | |
|---|---|---|---|---|---|---|---|---|---|
| AF-10 | Iso Type | NCO/OH | Blue Sharpie | Red Sharpie | Black Sharpie | Silver metallic Sharpie | Green Eraser | Green Paint | Blue Paint | Average |
| 40 | 502 | 1.50 | 4 | 5 | 5 | 5 | 5 | 4 | 4 | 4.57 |
| 40 | 502/401(50/50) | 1.50 | 5 | 5 | 5 | 5 | 5 | 5 | 5 | 5.00 |

The 2K waterborne coating of this invention achieves excellent anti-graffiti properties at low VOC level below 100 g/L. It is found that using the specific composition range of IPDT in HDT (range of the blend ratio of X EZ-M 502 and X EZ-D 401 is between 1:1 to 1:2 by weight) to make coating cured at ambient condition to reach certain glass transition temperature (at least 90 C) and the crosslinking density as well as the fluorine content in the waterbased formulation are the three most important factors. This coating has excellent recoatability and exceptional chemical resistance.

FORMULATION EXAMPLES

Example 1

Invention 2K polyurethane waterborne clearcoat for anti-graffiti coatings based on Neocryl XK 110, AF-10 and Rhodocoat X EZ-M 502 and X EZ-D 401

|  | Quantity (g) | Function | Supplier |
|---|---|---|---|
| Raw material Part A | | | |
| NeoCryl XK-110 | 24.43 g | Acrylic polyol | DSM NeoResins |
| Neocryl AF-10 | 25.24 g | Fluorinated acrylic polyol | DSM NeoResins |
| Eastman EEP | 1.30 g | Solvent | Eastman Chemical |
| Water | 20.43 g | | |
| Surfynol 104BC | 0.22 g | Defoamer | Air Products |
| BYK-340 | 0.55 g | Surface additive | BYK Chemie |
| PolyFox PF-156A | 0.21 g | Surface additive | OMNOVA Solutions |
| | 72.40 g | | |
| Raw material Part B (hardener) | | | |
| Rhodocoat XEZ-M 502 | 13.80 g | Hydrophilic polyisocyanate | Rhodia |
| Rhodocoat XEZ-D 401 | 13.80 g | Hydrophilic polyisocyanate | Rhodia |
| | 27.60 g | | |

| Formulation's characteristics | |
|---|---|
| VOC | 64 g/l |
| NCO/OH ratio | 1.5/1 |
| Solids content | 44.7% |
| Film properties: application on steel panel (dry film thickness: 2.5 mils approx.) | |
| Gloss (60°) | 86 |
| Persoz hardness (1/7 days) | 230/276 seconds |
| Pencil hardness | 2H |
| MEK double rub test (7 days) | 300+ |
| Pot life | ~6 hours |
| Tack free time | ~2 hours |
| Dry Through time | 11 hours |

Example 2

Comparative 2K polyurethane waterborne clearcoat for anti-graffiti coatings based on Neocryl XK 110, AF-10 and Rhodocoat X EZ-M 502

|  | Quantity (g) | Function | Supplier |
|---|---|---|---|
| Raw material Part A | | | |
| NeoCryl XK-110 | 17.50 g | Acrylic polyol | DSM NeoResins |
| Neocryl AF-10 | 18.08 g | Fluorinated acrylic polyol | DSM NeoResins |
| Eastman EEP | 0.34 g | Solvent | Eastman Chemical |
| Water | 29.28 g | | |
| Surfynol 104BC | 0.06 g | Defoamer | Air Products |
| BYK-340 | 0.15 g | Surface additive | BYK Chemie |
| PolyFox PF-156A | 0.06 g | Surface additive | OMNOVA Solutions |
| | 65.48 g | | |
| Raw material Part B (hardener) | | | |
| Rhodocoat XEZ-M 502 | 31.07 g | Hydrophilic polyisocyanate | Rhodia |
| Eastman EEP | 3.45 g | Solvent | Eastman Chemical |
| | 34.52 g | | |

| Formulation's characteristics | |
|---|---|
| VOC | 70 g/l |
| NCO/OH ratio | 2.5/1 |
| Solids content | 44.7% |
| Film properties: application on steel panel (dry film thickness: 2.5 mils approx.) | |
| Gloss (60°) | 88 |
| Persoz hardness (1/7 days) | 89/283 seconds |
| Pencil hardness | 2H |
| MEK double rub test (7 days) | 300+ |
| Pot life | ~6 hours |
| Tack free time | ~3 hours |
| Dry Through time | ~13 hours |

While the invention has been described and exemplified in sufficient detail to enable those skilled in the art to make and use it, various modifications, alternatives, and improvements should become readily apparent to those skilled in this art without departing from the spirit and scope of the invention.

What is claimed is:

1. An anti-graffiti coating composition comprising the reaction product of (A) a polyol blend comprising a fluorinated acrylic polyol and a non-fluorinated acrylic polyol, wherein the fluorinated polyol is a hydroxyl functional styrene acrylic copolymer emulsion and the non-fluorinated polyol is a hydroxyl functional styrene acrylic copolymer emulsion; and (B) a blend of polyisocyanates comprising (i) a hydrophilically modified trimer of hexamethylene diisocyanate (HDT) and (ii) a hydrophilically modified trimer of isophorone diisocyanate (IPDT).

2. The coating composition of claim 1 having a VOC below 100 g/L.

3. The coating composition of claim 1 wherein the fluorinated polyol comprises 1 to 40% by weight of the polyol blend.

4. The coating composition of claim 1 wherein the molar ratio of isocyanate units in the blend of polyisocyanates to hydroxyl units in the polyol blend is about 1 to 3.

5. The coating composition of claim 1 wherein said HDT and IPDT are surfactant based hydrophilic polyisocyanate emulsions in water, auto dispersible in aqueous phase, with at least one surfactant containing an anionic functional group, a countercation and, a polyethylene glycol chain fragment having one or more ethyleneoxy units, wherein the anionic functional group of said surfactant corresponds to the following formula:

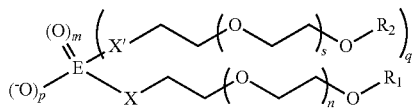

wherein: q is zero or 1; p is 1 or 2; m is 0 or 1; the sum: 1+p+2m+q is equal to three or to five; X and X' are a divalent group; s is an integer chosen between 1 and 30; n is an integer chosen between 1 and 30; E is a phosphorus atom; and $R_1$ and $R_2$ are a hydrocarbon radical.

6. The coating composition of claim 1 further comprising a solvent.

7. The coating composition of claim 1 wherein said fluorinated polyol has a glass transition temperature of from 10° C. to 80° C.

* * * * *